United States Patent
Dinh

(10) Patent No.: US 6,209,223 B1
(45) Date of Patent: *Apr. 3, 2001

(54) GRAIN DRYING SYSTEM WITH HIGH EFFICIENCY DEHUMIDIFIER AND MODULAR DRYING BIN

(75) Inventor: Khanh Dinh, Gainesville, FL (US)

(73) Assignee: Advanced Dryer Systems, Inc., Gainesville, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,063

(22) Filed: Dec. 7, 1999

(30) Foreign Application Priority Data

Dec. 8, 1998 (VN) .............................. S19981023

(51) Int. Cl.⁷ ...................................... F26B 19/00
(52) U.S. Cl. .................................. 34/86; 34/93; 34/167; 34/168
(58) Field of Search ................... 34/86, 90, 93, 34/167, 168, 174, 175, 176, 180, 181; 426/455, 465, 468, 472; 99/537, 471

(56) References Cited

U.S. PATENT DOCUMENTS

| | | | |
|---|---|---|---|
| 1,556,865 | * 10/1925 | Müller | 34/93 |
| 2,545,850 | * 3/1951 | Imhoff | 34/167 |
| 3,512,765 | * 5/1970 | Van Der Lely | 34/110 |
| 3,545,734 | * 12/1970 | Van Der Lely | 34/216 X |
| 3,561,740 | * 2/1971 | Walker | 431/115 X |
| 3,572,663 | * 3/1971 | Van Der Lely | 34/216 X |
| 3,726,024 | * 4/1973 | Erwin | 34/236 X |
| 3,727,323 | * 4/1973 | Meiners et al. | 34/170 |
| 4,048,727 | * 9/1977 | Botkins | 34/169 X |
| 4,118,875 | * 10/1978 | Sietmann et al. | 34/174 |
| 4,125,945 | * 11/1978 | Westelaken | 34/167 X |
| 4,240,209 | * 12/1980 | Cuthbertson et al. | 34/166 X |
| 4,249,891 | * 2/1981 | Noyes et al. | 34/171 X |
| 4,607,498 | 8/1986 | Dinh | 62/185 |
| 4,938,035 | 7/1990 | Dinh | 62/279 |
| 5,105,563 | * 4/1992 | Fingerson et al. | 34/203 |
| 5,343,632 | 9/1994 | Dinh | 34/507 |
| 5,404,938 | 4/1995 | Dinh | 165/113 |
| 5,443,539 | * 8/1995 | Westelaken | 34/168 X |
| 5,653,042 | * 8/1997 | Besnard | 34/86 X |
| 5,845,702 | 12/1998 | Dinh | 165/104.21 |

OTHER PUBLICATIONS

Letter from Bureau of Postharvest Research & Extension re: experimental testing during 1999 peak harvest season.

* cited by examiner

*Primary Examiner*—Stephen Gravini
(74) *Attorney, Agent, or Firm*—Kinney & Lange, P.A.

(57) ABSTRACT

This invention is a new, energy efficient, environmentally clean grain drying system which consists of two main parts: a hot drying air generator and a modular, portable drying bin. One novel aspect of the air generator is the introduction of a heat pipe design which enhances the efficiency of a dehumidifier heat pump, making its use economically feasible, especially for humid climates. Another novel aspect is the use of advanced burners incorporating antipollution devices. The hot air generator can operate on many sources of energy such as electricity; gasoline; diesel; biomass such as wood, charcoal, or rice husks; or even solar energy. The modular bin is made of several modules which can be disassembled, transported, and reassembled with great ease. The bin design also creates a very low air pressure drop, allowing substantial savings on blower energy. The complete system will offer great benefits for developing countries that are producers of rice, especially for those with humid climates. With this advanced dryer system, the small producers of rice located far from means of transportation can preserve their harvest and offer higher quality products at a lower production cost.

20 Claims, 10 Drawing Sheets

RICE DRYING SYSTEM WITH DEHUMIDIFIER

RICE DRYING SYSTEM
WITH DEHUMIDIFIER

DEHUMIDIFIER HEAT PUMP

DEHUMIDIFIER ENHANCED
WITH HEAT PIPE

DEHUMIDIFIER HEAT PUMP WITH
HEAT PIPE AND HEAT RECOVERY FROM ENGINE

DEHUMIDIFIER HEAT PUMP WITH
INDIRECT HEAT RECOVERY

DETAILS OF DIFFERENT MODULES

MODULAR BIN WITH PARALLEL CHANNELS

MODULAR BIN WITH PERPENDICULAR CHANNELS

MODULAR BIN WITH PERPENDICULAR
CHANNELS AND SCREW RECIRCULATOR

DRYER SYSTEM WITH DIRECT FIRED HEATER

DRYER SYSTEM WITH INDIRECT FIRED HEATER

DRYER WITH ADVANCED ANTI
POLLUTION INDIRECT FIRE BURNER

DRYER WITH WATER BOILER

MATCHING FLANGES DETAIL

AIR PATHS IN THE GRAIN MASS

MODULAR BIN WITH EXTERNAL
GRAIN RECIRCULATOR

GRAIN DRYING SYSTEM WITH HIGH EFFICIENCY DEHUMIDIFIER AND MODULAR DRYING BIN

CROSS-REFERENCE TO RELATED APPLICATION(S)

This application claims the priority benefits of foreign patent application number S19981023, Vietnam, filed Dec. 8, 1998.

FIELD OF THE INVENTION

The present invention relates generally to a grain drying system, and particularly to a rice drying system comprising a hot air generating source, such as a high-efficiency dehumidifier or a fuel burner, and a modular drying bin which can be easily disassembled and reassembled for ease of transportation.

BACKGROUND OF THE INVENTION

Drying of freshly harvested paddy rice is essential to insure its conservation. Typically, paddy rice is harvested between 20% and 30% moisture content and good conservation requires less than 14%. Paddy rice is traditionally dried under the sun. This method, although low in cost, has many deficiencies. Sun drying is difficult to control, drying is not even between the top layer and the bottom layer, and rain can ruin exposed grains. Birds, rodents and insects can also substantially damage a harvest. Drying paddy rice in humid climates is especially difficult during the rainy season because the ambient air is already wet, and the rice will not dry unless heated to high temperatures which can damage the quality of the rice as well as reduce the whole grain yield.

The need for better quality finished rice has called for better methods of drying. The International Rice Research Institute (IRRI) and other institutions have studied methods of drying paddy rice based on hot air and given recommendations for optimum conditions of temperature, humidity, flow rates, and time of drying. In short, these conditions can be summarized as follows: lower temperatures are generally better, and the temperature should be kept below 45–50 degrees C.; relative humidity of the drying air should be low enough to insure efficient drying; the air flow rate must be high enough to insure drying throughout the whole mass of the grains; and drying rates of about 2% to 3% moisture reduction per hour are best because faster drying could make the grain brittle.

Until now, the majority of rice dryers relied on the heating of ambient air, with heat sources such as an oil or a coal burner, and the blowing of the hot air into a drying bin containing the paddy rice. This principle is quite appropriate in dry climates, but deficient in humid climates because the ambient air contains high levels of moisture and can only provide marginal drying capacity. Therefore, high temperatures (as high as 60 degrees C.) are used to the detriment of rice quality, and long hours of drying result in high energy costs.

Several types of drying bins are now used. Two of them are quite common in Asia: flat bed dryers and tower dryers. Flat bed dryers are made of a large surface chamber with a perforated floor located about half way up in the chamber, creating a bottom air plenum and a grain storage chamber on top. Hot air is blown into the bottom chamber and admitted into the grain storage chamber through the perforated floor. Although very simple, the flat bed dryers do not provide even drying; the bottom layer dries faster than the top layer. Even drying requires labor intensive and health-hazardous manual turning over, a task which exposes workers to hot, humid air as well as harsh, silicon-rich grain dust.

Another system is the tower dryer, consisting of a tall tower in which grain is fed at the top and allowed to fall to the bottom, while hot air is blown upwards in a counter flow fashion. In a tower dryer, grain does not dry in one pass, but must be recirculated several times, requiring mechanical devices such as a bucket elevator. Because of their complexity, the tower dryers are more expensive and can only be economical in larger capacities. Both of the above dryer systems are very difficult to move, because they are fairly large and require a prepared fixed surface. The flat bed system dries grains in thin layers (typically less than 25 cm) and therefore requires a large surface. The tower dryer, as the name indicates, is usually very tall (on the order of 10 meters) and includes complicated grain conveying devices such as bucket elevators.

BRIEF SUMMARY OF THE INVENTION

It is therefore an object of the present invention to provide a grain drying system which can overcome the above mentioned drawbacks. While the system may be used with any grain, bean, seed, kernel, or similar product, the preferred embodiment is specially designed for use with rice. This invention is a new, energy efficient, environmentally clean grain drying system which consists of two main parts: a hot drying air generator and a modular, portable drying bin. The hot drying air generator is capable of providing drying air at relatively high air pressure and volume. The drying air can be produced by direct heating, indirect heating or by the use of a heat pump or a dehumidifier. Such a hot air generator can use, for example, fossil fuels, biomass, electricity, or solar energy as a power source.

One novel aspect of the air generator is the introduction of a heat pipe design which enhances the efficiency of a dehumidifier heat pump, making its use economically feasible, especially for humid climates. Another novel aspect is the use of advanced burners incorporating antipollution devices. The hot air generator can operate on many sources of energy such as electricity; gasoline; diesel; biomass such as wood, charcoal, or rice husks; or even solar energy.

The rice drying system of the present invention includes a modular bin made of several modules which can be disassembled for ease of transportation and reassembled at the site of use together without tools. The bin design also creates a very low air pressure drop, allowing substantial savings on blower energy.

The complete system, comprising a drying air generator and a modular bin, will offer great benefits for developing countries that are producers of rice, especially for those with humid climates. With this advanced dryer system, the small producers of rice located far from means of transportation can preserve their harvest and offer higher quality products at a lower production cost.

DETAILED DESCRIPTION

A preferred embodiment of the present invention will be explained with reference to the drawings.

A rice drying system according to the present invention (FIG. 1) comprises a hot air generating source such as high-efficiency dehumidifier 11 connected to a modular construction drying bin 12.

Figure 2:
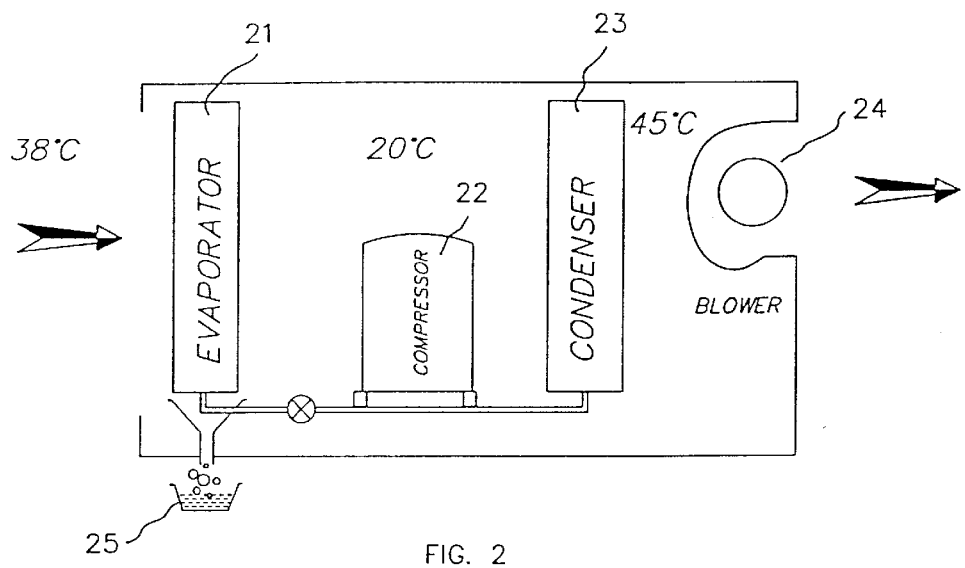
FIG. 2: dehumidifier heat pump

A preferred embodiment of a high efficiency dehumidifier (FIG. 2) is a vapor compression heat pump system which includes an evaporator 21, a compressor 22, a condenser 23 and a blower 24. The principle of operation is well known in the field of refrigeration: ambient air is blown through the evaporator, which is kept cold by evaporation of a refrigerant. The moisture in the air condenses on the evaporator and is drained away as condensate 25. The cold air which exits the evaporator then enters the condenser, where it is reheated; then, the now dry and warm air is sent to the point of use.

Figure 3:
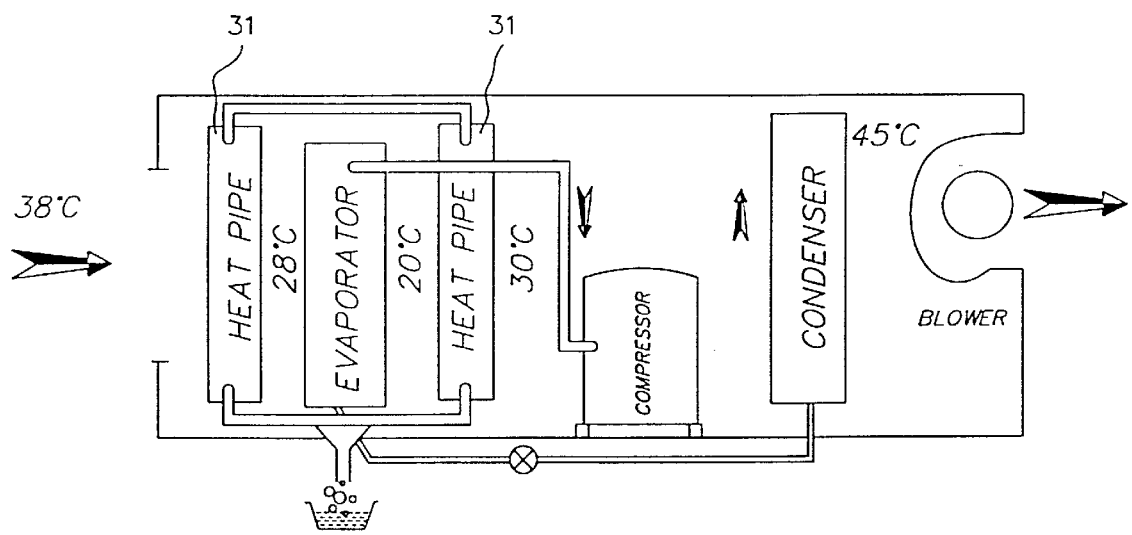
FIG. 3: dehumidifier heat pump enhanced with heat pipe

Such a dehumidifier can be improved by the use of a heat pipe heat exchanger 31, which transfers heat between the warm entering air and the cold air leaving the evaporator coil (FIG. 3), as shown in U.S. Pat. Nos. 5,404,938, 4,938,035, and Taiwanese and Chinese patents of inventor Khanh Dinh. The use of the dehumidifier heat pipe invented by Dinh can reduce the power consumption of the heat pump by up to 50%, saving a large amount of energy.

Figure 4A:
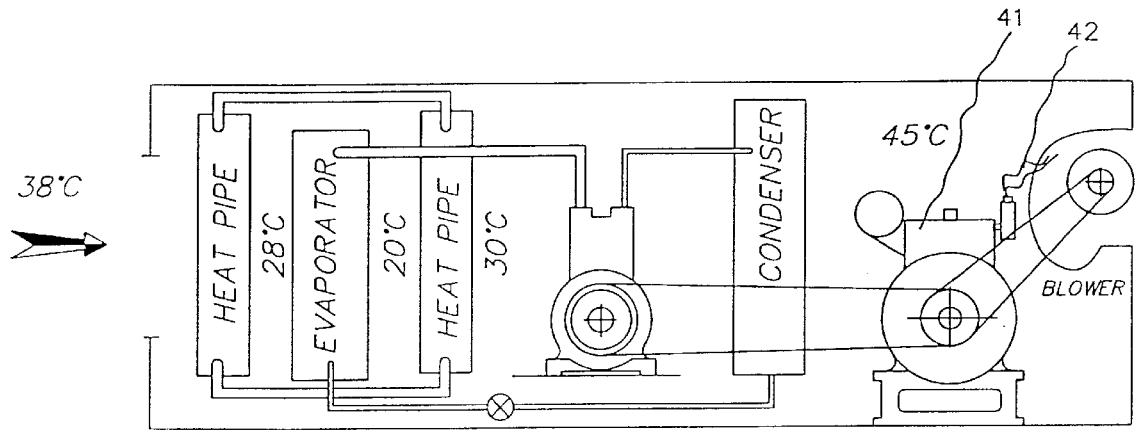
FIG. 4a: dehumidifier heat pump with heat pipe and heat recovery from engine
Figure 4B:
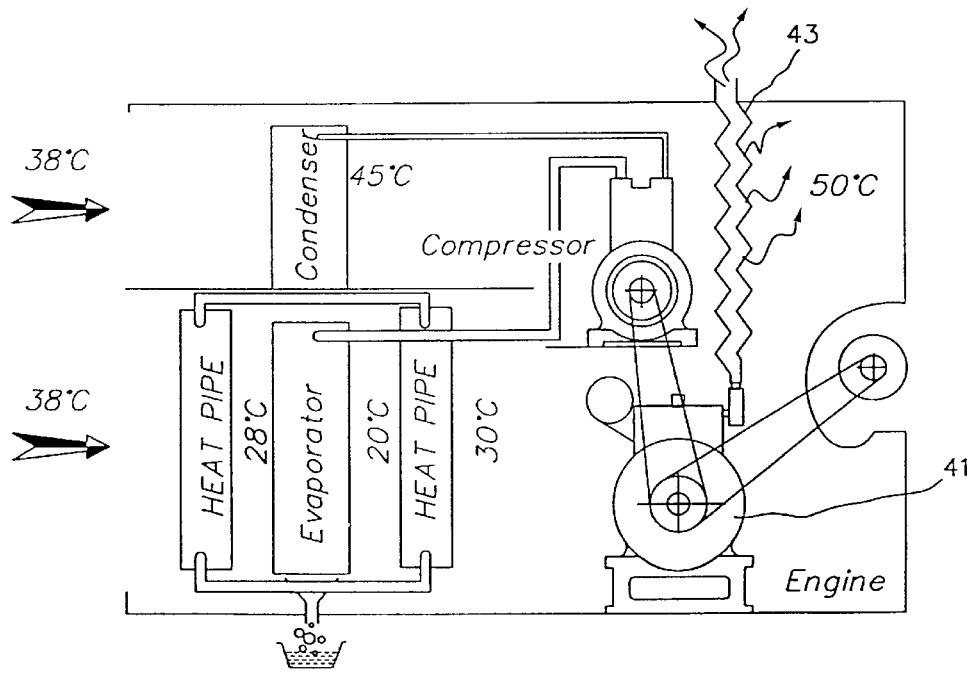
FIG. 4b: dehumidifier heat pump with indirect heat recovery

The dehumidifier heat pump can also use an internal combustion engine for its power source, with a series air flow configuration such as in FIG. 4a or with a parallel air flow configuration as in FIG. 4b. In this invention, the dehumidifier is further improved by recovering waste heat 42 from the internal combustion engine 41 which is used to power the heat pump. Waste heat from the engine exhaust can be recovered directly as in FIG. 4a or indirectly as in FIG. 4b via heat exchanger 43. FIG. 4a shows a dehumidifier with heat pipe that is powered by an internal combustion engine whose exhaust heat 42 is directly recovered. FIG. 4b shows a dehumidifier with internal combustion engine with indirect heat recovery 43.

Figure 8:
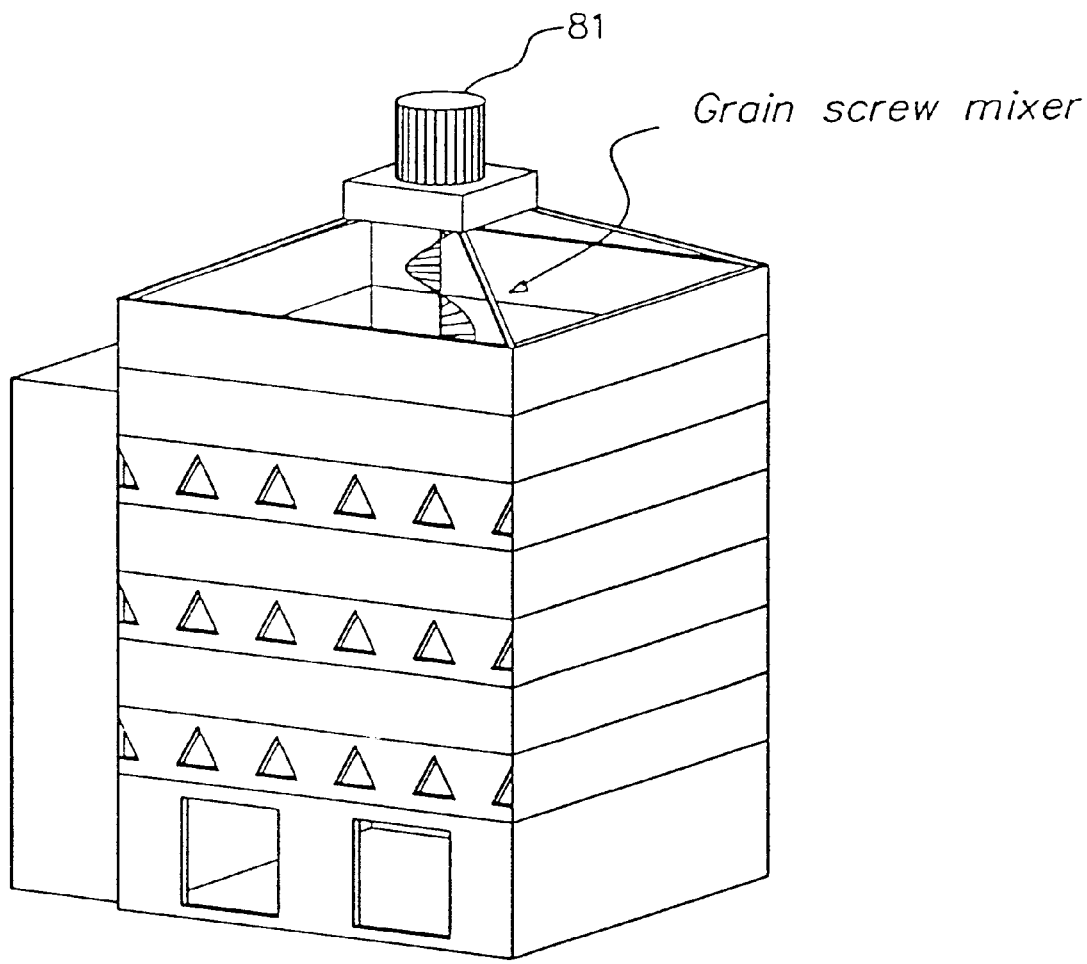
FIG. 8: modular bin with perpendicular channels and screw recirculator

The modular drying bin (FIG. 5) can be used as a static or recirculating bin. Such a bin includes top module 51 for grain storage, air-in module 52, air-out module 53, bottom module 54 and air plenum 55. In the static mode, grain is loaded in the bin until it is full, and air is blown through the mass of the grain. In the recirculating mode, grain is taken out of the bottom of the bin and put back at the top, usually by a mechanical device such as a bucket elevator 141 (FIG. 14) or a screw conveyor 81 (FIG. 8). The drying bin is designed to be disassembled in modules for ease of transportation, and presents many advantages over traditional bins: as a static bin, it requires a minimum amount of labor for mixing the grains to insure even drying, and as a recirculating bin, it requires a much smaller recirculation mechanism. The bin typically requires only half the air pressure needed in a flat bed dryer and therefore can save a large amount of blower energy.

Figure 1:
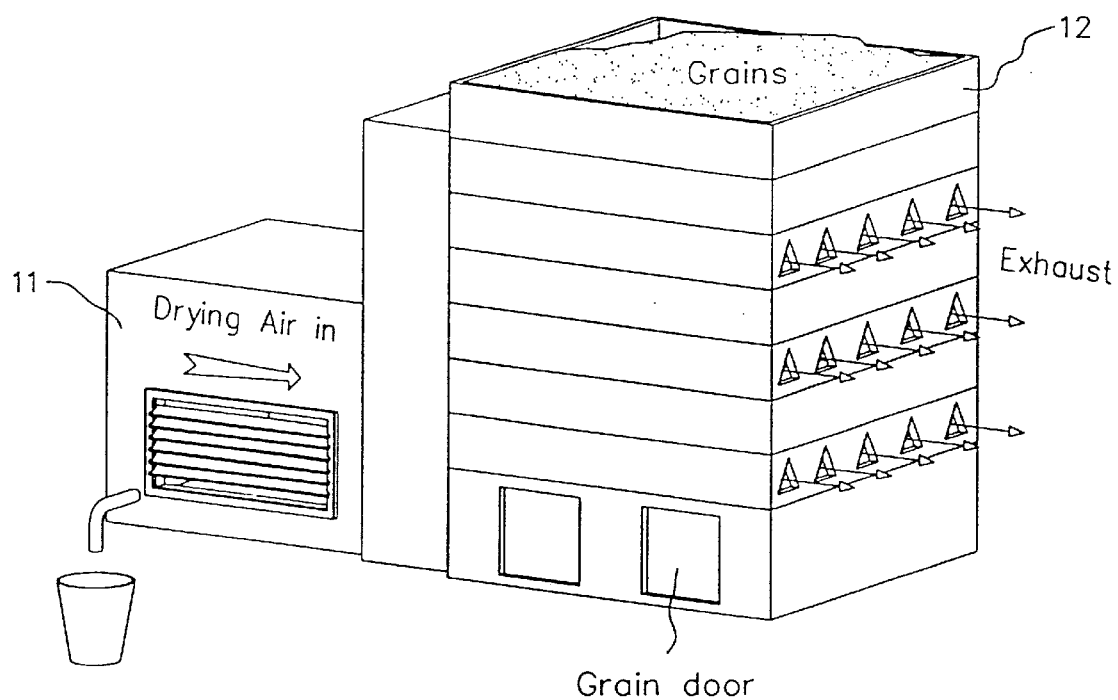
FIG. 1: complete rice drying system with dehumidifier
Figure 5:
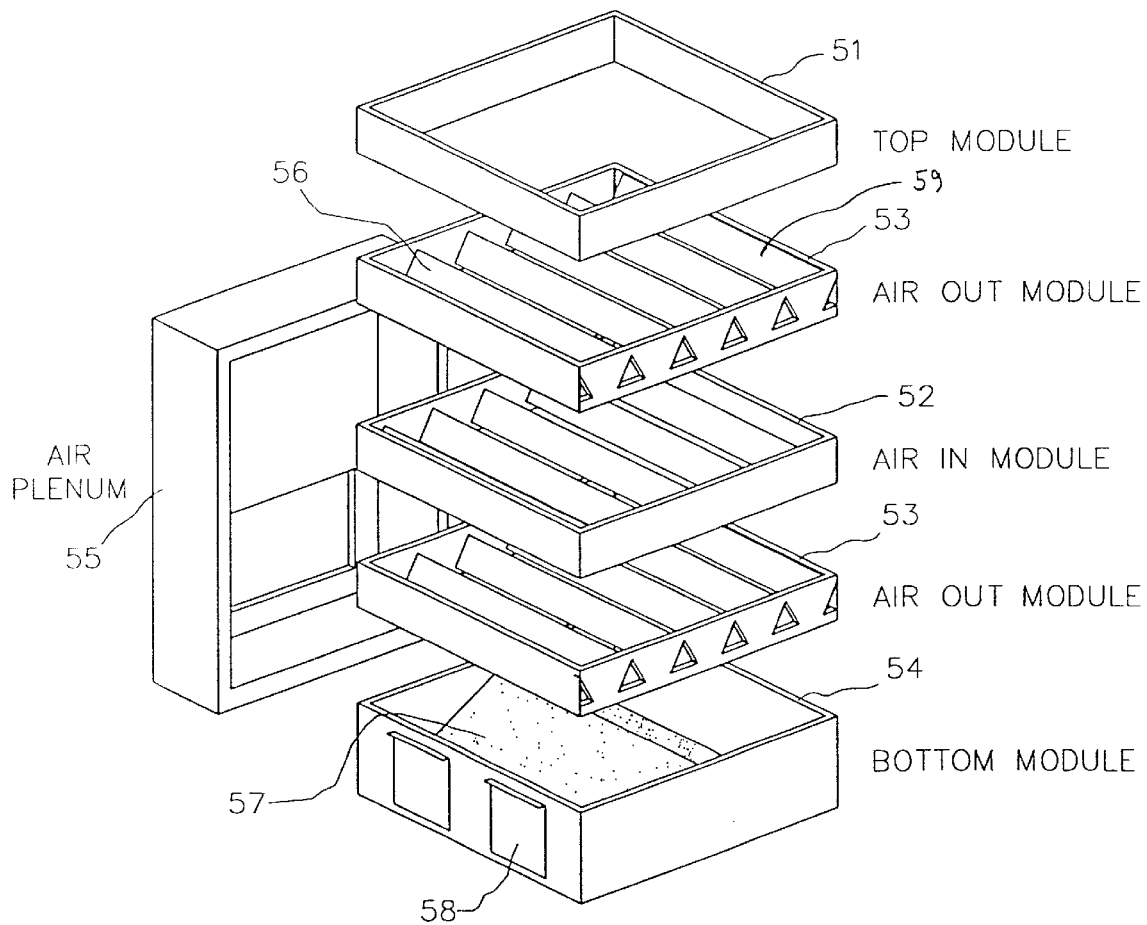
FIG. 5: details of different modules

As shown in FIGS. 1 and 5, the drying bin consists of several modules (51 to 54), typically of a generally square or rectangular shape, which can be mounted one on top of the other. Typically, the drying bin is made of five types of modules: a top module 51 for reserve grain storage; air-in modules 52 connected to the supply of drying air; air-out modules 53 with channels open to the ambient air; a bottom module 54 with means for grain removal; and an air supply plenum 55 which connects the bin to the drying air source. The modules have several channels 56 for admitting or exhausting air. Each channel 56 can be made in the general shape of an inverted V or U, such that air can freely circulate while grains are retained. The top module 51 may not have channels; when this is the case, the top module 51 may be used for extra grain storage and to allow surplus drying air to escape to the atmosphere. The bottom module 54 may be different in design to incorporate means for final drying such as a perforated floor 57, and means for removing grains such as sliding doors 58, trap doors, or a screw extractor.

The air-in modules 52 typically have whole inverted V channels 56, and the air-out modules 53 typically have whole channels 56 in the interior and half channels 59 at the two sides. This disposition creates an offset arrangement of the channels when the modules are stacked on top of each other. This offset (FIG. 13) creates equal length paths 131 for air to go through the mass of the grain, insuring even drying. Typically, there is one more air-out module than air-in modules, in order to create more exhaust openings to lower the speed of the exhausting air. The top module 51, which is open, also provides for surplus air exhaust 132. It is desirable to have a lower exhaust air speed in order to prevent grains from being entrained and also to reduce the blower energy requirement. However, it is necessary for the air speed to be high enough to remove the water vapors released by the grains by carrying those vapors out of the bin. An adequate exhaust of the wet air is necessary to prevent re-condensation on the grains or re-absorption of water by the layers of grain which are at a colder temperature or lower moisture content.

Figure 13:
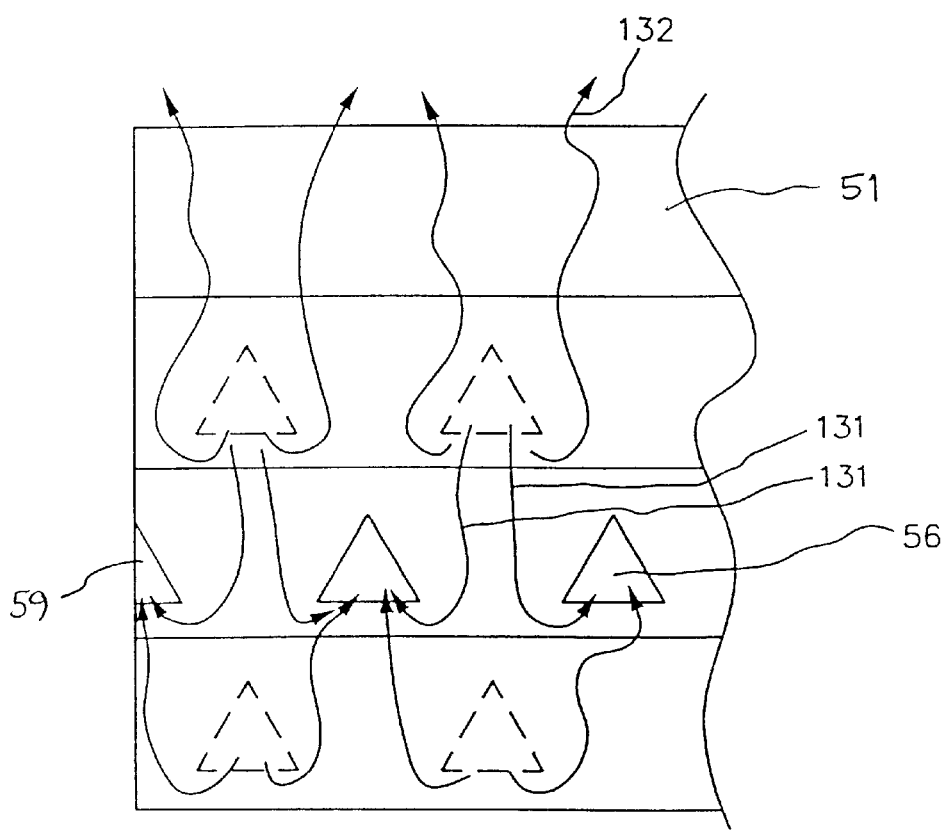
FIG. 13: air paths in the grain mass

In FIG. 13, the modules are stacked with the channels 56 in parallel, drying air is admitted from one side, typically through a common air plenum 55 which acts as a pressure box to equalize the air flows through each of the air-in channels in all modules. The air then will diffuse through the exposed surface of the grain at the bottom of the channels 56, go through the mass of the grain and collect into the exhaust channels 56 and 59. From the exhaust channels 56 and 59, wet air will discharge into the atmosphere. Some air will also discharge from the top module 51 through the whole surface of the grain filling the top module 51.

Figure 6:
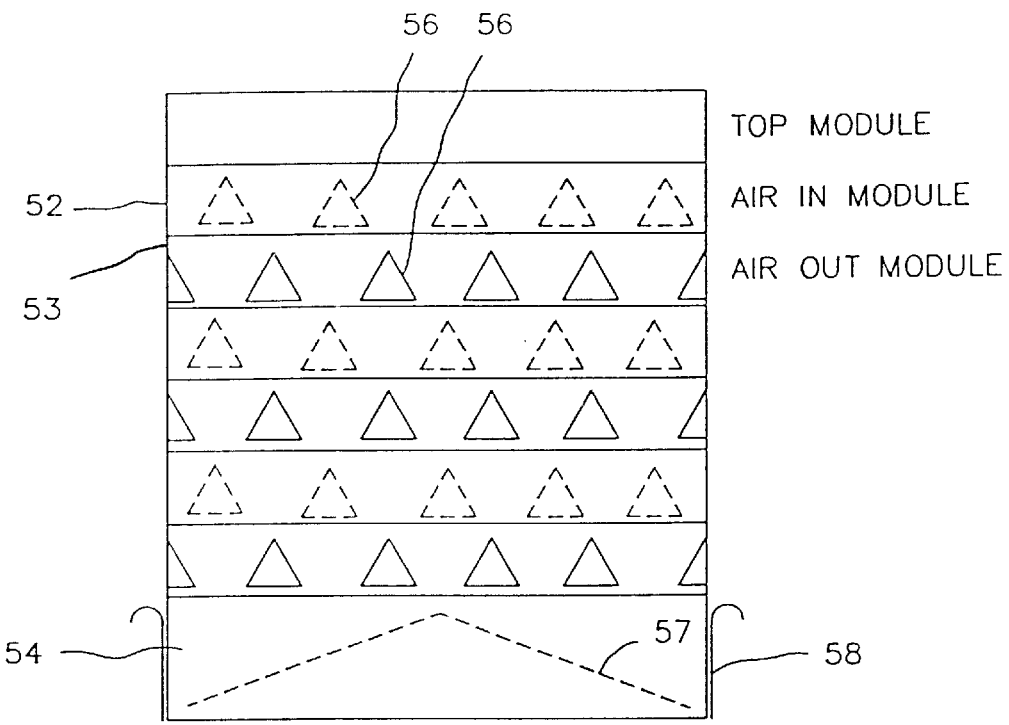
FIG. 6: modular bin with parallel channels

FIG. 6 shows a parallel flow arrangement of the channels 56 between the air-in modules 52 and air-out modules 53.

When the dimensions and spacing of the different components of the bin are well calculated, air will distribute evenly in the mass of the grain and provide even drying. This reduces the need for mixing of the grain, although it is recommended to provide some mixing during the drying process. Such mixing may be accomplished by removing some grain at the bottom of the bin and putting it back in the top of the bin. Mixing can be done manually or by mechanical means.

Figure 7:
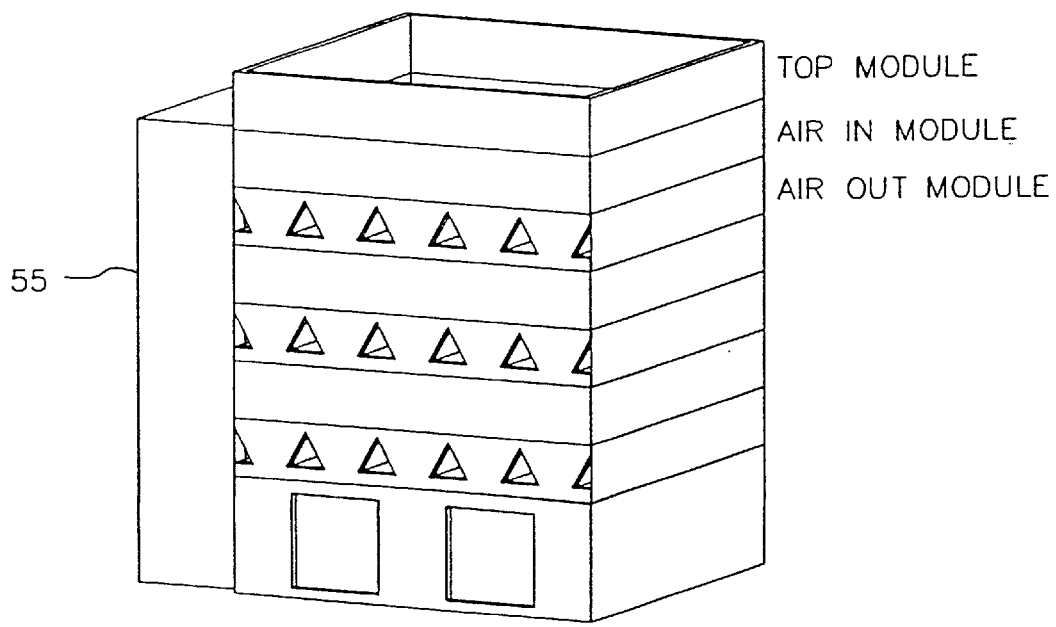
FIG. 7: modular bin with perpendicular channels

FIG. 7 shows a drying bin using perpendicular channels. This configuration allows for air to be exhausted from both sides of the bin, providing a drying bin with a very low air pressure drop for maximum economy of blower energy. This design, however, because of the existence of uneven paths for air flow, provides for less even drying in the mass of the grain. This design is recommended to be used with a mechanical mixing device 81 such as in FIG. 8.

Figure 9:
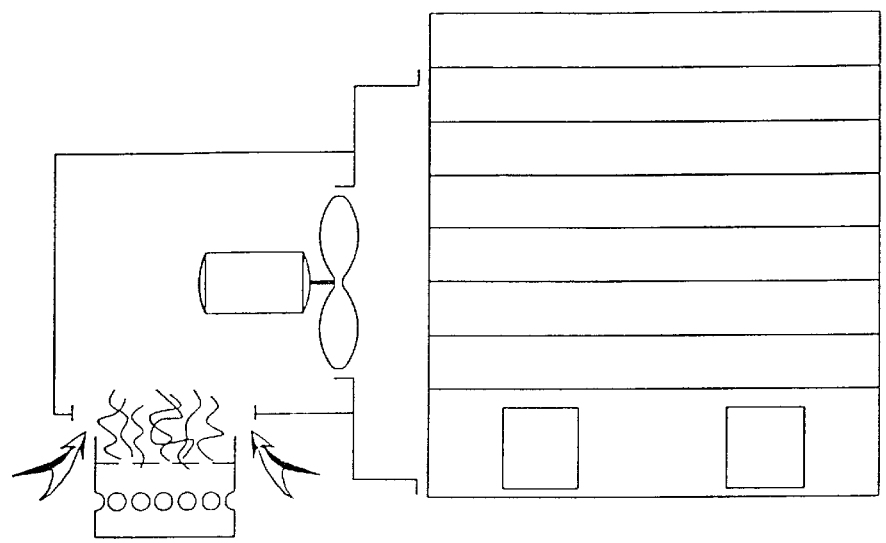
FIG. 9: dryer system with direct fired heater
Figure 10A:
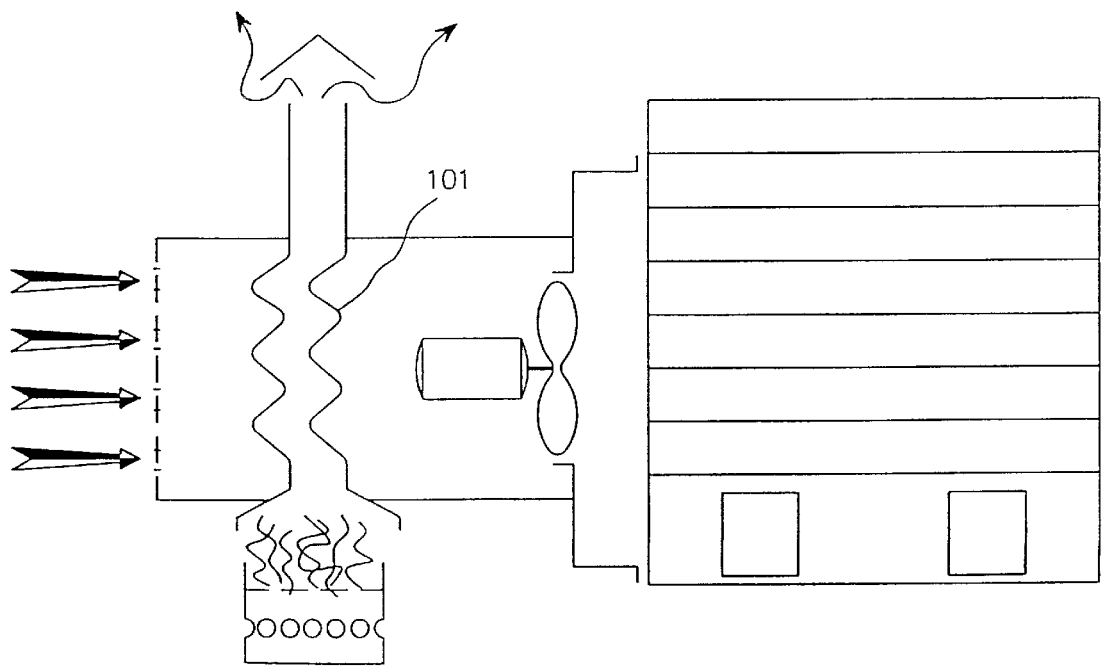
FIG. 10a: dryer system with indirect fired heater
Figure 10B:
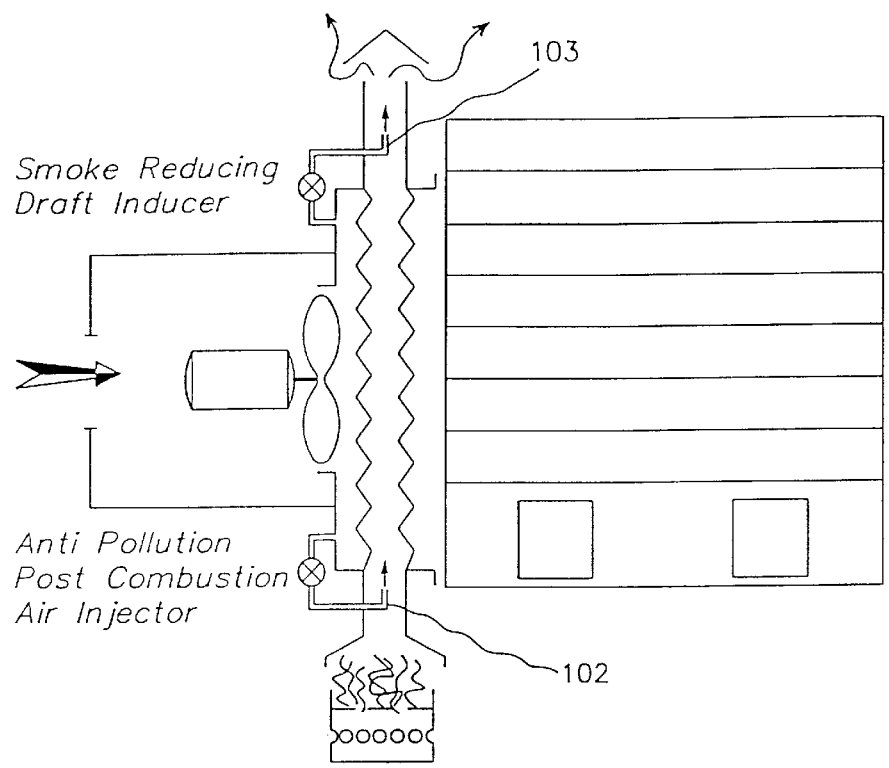
FIG. 10b: dryer with advanced anti pollution indirect fire burner
Figure 11:
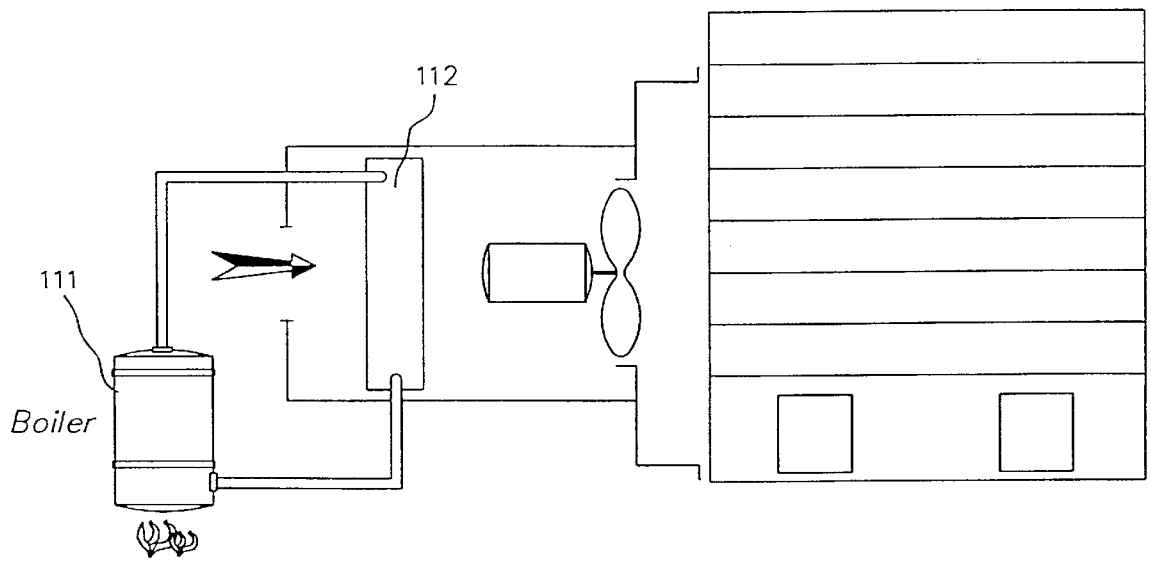
FIG. 11: dryer system with water boiler

The modular drying bin can be used with a multitude of sources of drying fluid, the most common of which is heated air. Hot air can be produced by any known method, including the following: it can be directly created by a burner such as a husk burner, a charcoal or wood burner, or an oil burner (FIG. 9). Air can also be heated indirectly by the use of a heat exchanger 101 placed in the air stream (FIG. 10). FIG. 10b shows an advanced indirect heater system with anti-pollution features such as a post combustion air injector 102 and a smoke reducing draft inducer 103. A water boiler 111 with a heat transfer coil 112 can also be used (FIG. 11). Indirect heating has the advantage of not introducing any combustion gases into the drying air. The hot drying air is then pumped into the bin via the supply plenum 55 by means of a centrifugal blower, a propeller fan, or any other means for moving air. The source of drying air can also be a heat pump or a dehumidifier (FIGS. 4a and 4b). The means for providing and moving the drying medium may be any which is known or obvious in the art.

Figure 12:
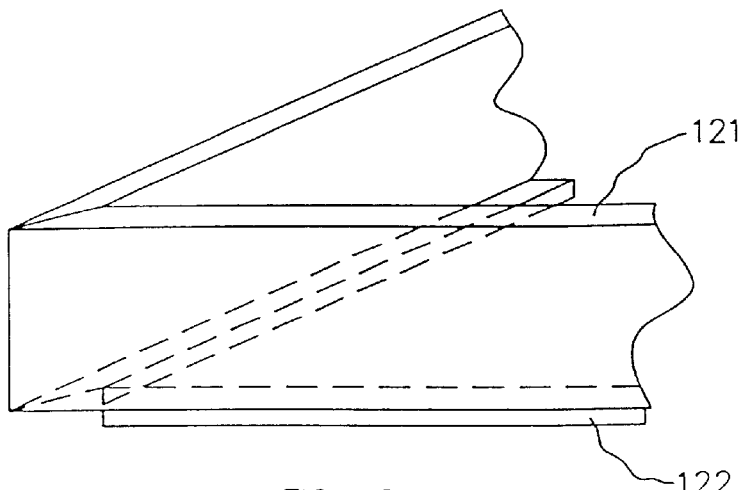
FIG. 12: detail of matching flanges

The modular drying bin can be constructed with matching flanges 121 and 122, as in FIG. 12, for ease of disassembly, transportation and reassembly. Each module can be transported to the site of use. The bin is assembled by stacking the different modules on top of each other. There is no need for any fastener such as screws, nuts or bolts. Thus, no tools are needed for the assembly or disassembly of the bin. It should be noted that the modules making up the bin can be made of metal, wood, plywood, or any other suitable material. Each module can be made with fewer pieces than illustrated, or even in one piece, or with any other fabrication variation that would be obvious or known to one skilled in the art.

The air plenum 55 is installed on the side of the bin, then connected to the hot air source. The heat pump dehumidifier 11 does not need to be disassembled. One just needs to put it in front of the supply air plenum 55 and insure air tightness with the use of a seal such as a rubber gasket. In the bin, the hot air will go through the mass of the grain (FIG. 13), collect in the exhaust channels 56 and be discharged via the exhaust channels 56. The process will stop when the moisture content of the grain has decreased to the desired level.

Figure 14:
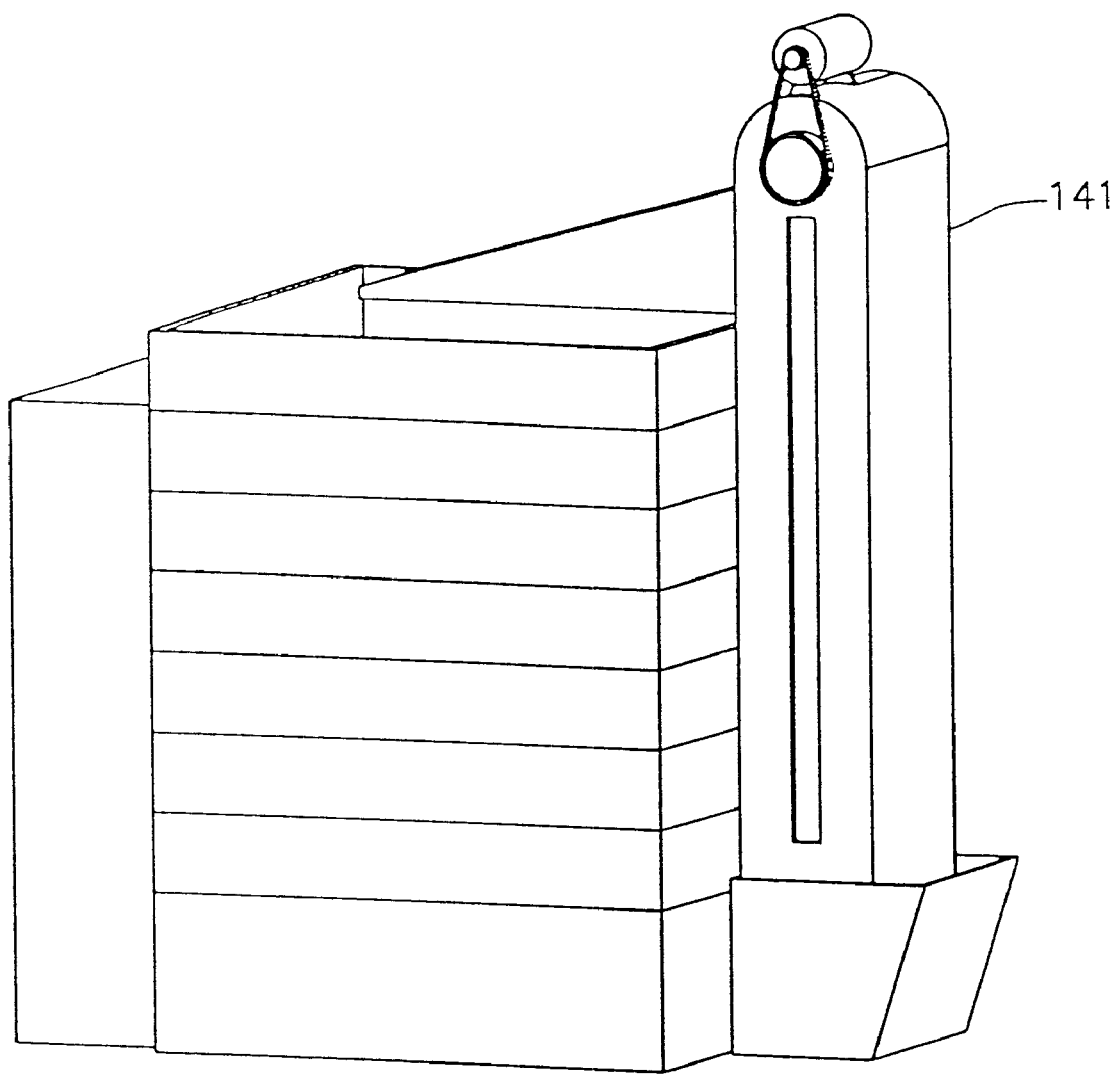
FIG. 14: modular bin with external grain recirculator

With mechanical mixing, the modules can be installed with the channels perpendicular, preferably with a mixing device which can be of a screw type, elevator type, or other known variation. The mixing device can be inserted in the open space left between the channels, so that no external structure will be needed for the mixing device (FIG. 8), or there can be a bucket elevator 141 installed on the outside of the bin (FIG. 14).

Although this bin, as shown in the preferred embodiment, is designed especially for paddy rice, it can also be used to dry polished rice or other grains and agricultural products such as coffee, corn, soybean, and pepper. The basic modular construction allows for easy transportation to remote fields to save on the cost and time for transporting the wet grain to the dryer.

Although the present invention has been described with reference to preferred embodiments, workers skilled in the art will recognize that changes may be made in form and detail without departing from the spirit and scope of the invention.

What is claimed is:

1. A grain drying system comprising:
   a portable modular grain bin comprising a plurality of stackable modules; a module having a plurality of horizontal, structural air channels extending across the module; a channel comprising an inlet at an end of the channel and an opening along a bottom surface of the channel; and
   a drying air generating source connected to the grain bin;
   the grain drying system having an air flow path from the air generating source into an inlet of a channel, and from the channel, through a channel opening, into a mass of grain.

2. The grain drying system according to claim 1, wherein the modules comprise:
   a top module;
   an air-in module;
   an air-out module;
   a bottom module; and
   an air supply plenum connecting the grain bin to the air generating source.

3. The grain drying system according to claim 2, wherein:
   each air-in module has a plurality of air channels arranged parallel to each other for admitting air; and
   each air-out module has a plurality of air channels arranged parallel to each other for exhausting air.

4. The grain drying system according to claim 2, wherein the bottom module has a means for removing grain.

5. The grain drying system according to claim 2, wherein the top module does not have air channels.

6. The grain drying system according to claim 3, wherein the air channels of two successive modules are arranged in a generally parallel fashion, and wherein the channels of two successive modules are offset with respect to each other and not directly on top of each other.

7. The grain drying system according to claim 3, wherein the air channels of two successive modules are arranged in a generally perpendicular fashion.

8. The grain drying system according to claim 1, further comprising means for recirculation of the grains.

9. The grain drying system according to claim 1 wherein the air generating source is a heat pump dehumidifier.

10. The grain drying system according to claim 9 wherein the heat pump dehumidifier contains a heat pipe.

11. The grain drying system according to claim 10 wherein waste heat is recovered from an internal combustion engine.

12. The grain drying system according to claim 1 wherein the air generating source is a direct fired burner.

13. The grain drying system according to claim 1 wherein the air generating source is an indirect fired burner.

14. The grain drying system according to claim 1 wherein the air generating source is a water boiler with a heat exchanger.

15. The grain drying system according to claim 1 wherein the air generating source is an advanced burner with anti-pollution air injection.

16. The grain drying system of claim 1, further comprising a channel comprising an outlet at an end of the channel and an opening along a bottom surface of the channel, the grain drying system having an air flow path from a mass of grain into a channel through a channel opening, and from the channel to the outside of the bin through the outlet.

17. The grain drying system according to claim 16, wherein a channel is in the general shape of an inverted V or inverted U.

18. The grain bin according to claim 20, wherein a channel is in the general shape of an inverted V or inverted U.

19. A grain bin for drying grain comprising a plurality of portable, stackable modules, wherein the modules comprise:

a top module;

an air-in module having a plurality of horizontal, structural air channels extending across the module; a channel comprising an inlet at an end of the channel and an opening along a bottom surface of the channel; the grain bin having an air flow path from an air generating source into an inlet of a channel, and from the channel, through a channel opening, into a mass of grain;

an air-out module having a plurality of horizontal, structural air channels extending across the module; a channel comprising an outlet at an end of the channel and an opening along a bottom surface of the channel; the grain bin having an air flow path from a mass of grain into a channel through a channel opening, and from the channel to the outside of the bin through the outlet; and a bottom module.

20. The grain bin of claim 19, wherein:

each air-in module has a plurality of air channels arranged parallel to each other for admitting air; and each air-out module has a plurality of air channels arranged parallel to each other for exhausting air.

\* \* \* \* \*